United States Patent

Cote

[15] 3,651,501

[45] Mar. 21, 1972

[54] TRANSDUCER HEAD ACTUATOR FOR MAGNETIC DISC MEMORY

[72] Inventor: Martin J. Cote, Burbank, Calif.

[73] Assignee: The Singer Company

[22] Filed: Aug. 31, 1970

[21] Appl. No.: 68,286

[52] U.S. Cl. ..........340/174.1 F, 179/100.2 CA, 340/174.1 E

[51] Int. Cl. ....................G11b 5/54, G11b 21/12, G11b 5/60

[58] Field of Search.............................340/174.1 F, 174.1 E; 179/100.2 CA, 100.2 P; 346/74 MC

[56] References Cited

UNITED STATES PATENTS

| | | | |
|---|---|---|---|
| 3,368,210 | 2/1968 | Zimmer | 340/174.1 E |
| 2,862,781 | 12/1958 | Baumeister | 179/100.2 P |
| 3,057,970 | 10/1962 | Brunner | 179/100.2 P |
| 3,333,065 | 7/1967 | Torok | 179/100.2 CA |

*Primary Examiner*—Bernard Konick
*Assistant Examiner*—Vincent P. Canney
*Attorney*—Linval B. Castle

[57] ABSTRACT

A system for urging a normally retracted magnetic read/write head into working relationship with a magnetic memory disc. The retracting force of a head supporting leaf spring is overcome by a simple system of levers actuated by the tightening of a cable connected with a plurality of other lever systems around the disc. The cable is looped around the capstan on a motor shaft so that the motor, when driven to its stalled condition, will tighten the cable.

4 Claims, 3 Drawing Figures

INVENTOR.
MARTIN J. COTE
BY [signature]
ATTORNEY

TRANSDUCER HEAD ACTUATOR FOR MAGNETIC DISC MEMORY

SUMMARY OF THE INVENTION

In order to obtain maximum signal response and optimum bit density in a magnetic disc memory, it is necessary that the transducer head be placed extremely close to the surface of the magnetic medium. Contact of the head with the surface of the medium would be most desirable, except that the medium would rapidly become worn and damaged. Therefore, the common practice is to mount the transducer head in a shoe that is designed to lift the head a very small distance from the surface of the medium and then float on the air bearing produced by laminar air flow at the disc surface.

There are two basic flying head designs. One design permits the shoe to rest upon the disc surface during slow disc rotation and when the disc is stationary. Then, as the disc increases in rotational speed, the head is lifted from the disc surface either by the self lifting design of the flying shoe, or by some type of mechanical retraction system. If the flying shoe is designed for self lifting, there will be considerable wearing between the shoe and the disc surface during the period that the disc is starting and stopping its rotation. Such wearing eventually leads to destruction of the magnetic medium on the surface. If a retracting mechanism is used to lift the head from the disc surface, there is the continual danger that a power failure will deactivate the retracting system and will permit the head to drop onto the rotating disc surface and severely damage or destroy the magnetic medium.

The second basic design for supporting magnetic heads suspends the transducer and its shoe an appreciable distance from the surface of the magnetic medium by a leaf spring or the like and then forces the shoe into close proximity to the disc surface by some sort of actuator. The advantage of this type becomes apparent when there is a power failure during operation. When such a power failure does occur, the actuator mechanism may fail but will thereby release the downward force upon the transducer and permit it to lift from the magnetic medium. The result is that transducer head will fail to read and record the signals during the failure but the magnetic head and the data contained therein is not destroyed.

Briefly described, the present invention is for an electromechanical transducer head actuator. The transducers are mounted in shoes that are attached to the housing by a reed spring that forces the shoes to float on the air bearing produced by the laminar air flow on the surface of a rotating memory disc. The shoes are also coupled to a relatively strong leaf spring which retracts the shoe from the disc surface, and bearing upon this spring is a crank lever that is pivoted so that, when actuated, it will overcome the leaf spring retracting force to permit the reed spring to accurately position the transducer head in close proximity to the disc surface. The lever is actuated by the tightening of a cable looped around a pulley on the end of the crank lever and the cable, which is connected to all other crank lever pulleys associated with other flying heads on the disc surface, is tightened by a small, electric motor which is driven to its stall condition. Therefore, driving the motor to stall will actuate all magnetic transducers simultaneously and any electrical power failure will release the stalled electric motor and similarly release all crank levers so that the retracting forces of the leaf springs will permit the respective transducer heads to lift from the disc surface.

DESCRIPTION OF THE DRAWINGS

In the drawings which illustrate a preferred embodiment of the invention:

FIG. 1 illustrates in perspective a typical single disc magnetic memory, which includes a cylindrical housing 10 comprising a base 12, a top 14, and a sidewall 16. Shown within the cutaway portion of housing 10 is a memory disc 18, which is coupled to a rotatable shaft 20 of a drive motor 22.

Figure 1:
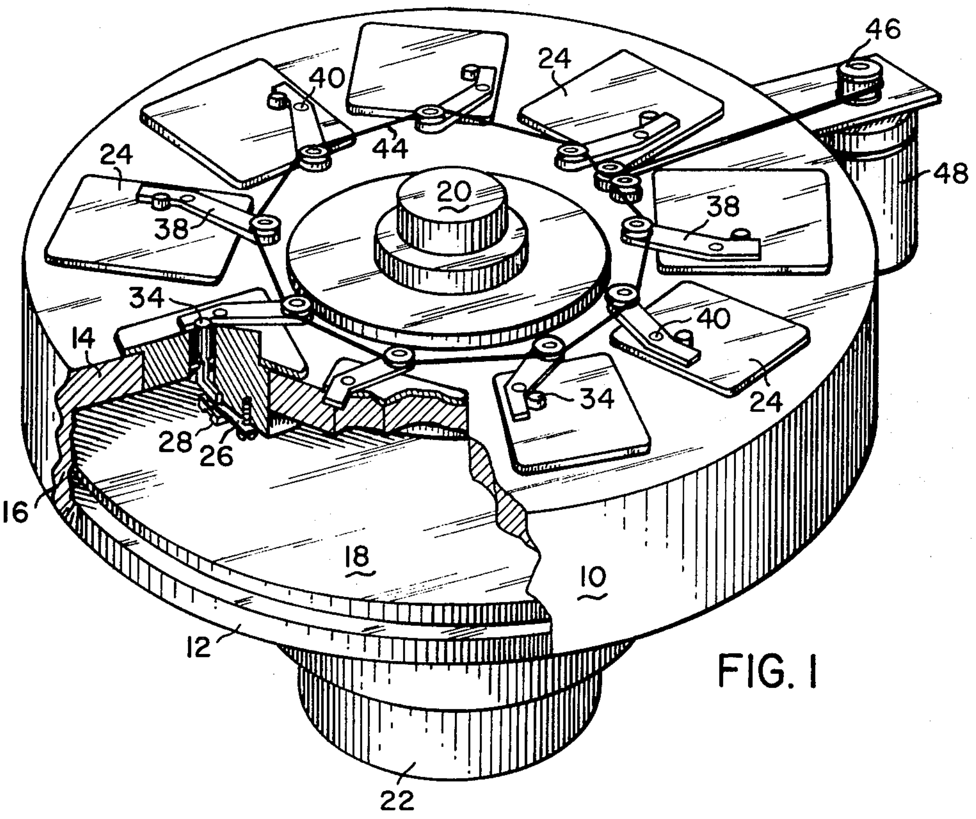
FIG. 1 is a perspective drawing illustrating a typical magnetic disc memory with a cutaway portion showing a head and actuator.

It is to be assumed that the disc memory illustrated in FIG. 1 is a single surfaced disc; that is, the magnetic transducers are positioned at the recording medium on only one surface of the disc. As shown in the Figure, the magnetic transducers are mounted in transducer modules 24, which are suitably positioned around the housing top 14 so that the associated transducer is aligned in the proper recording track on the recording surface of disc 18. Transducer modules 24 are preferably inserted in mating holes in the housing top 14 and may be attached to top 14 by suitable clamps (not shown).

Figure 2:
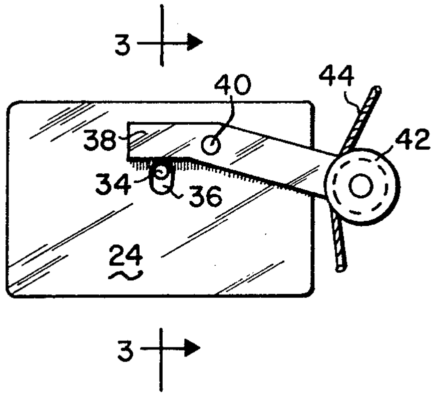
FIG. 2 is a plan view of a head actuator.
Figure 3:
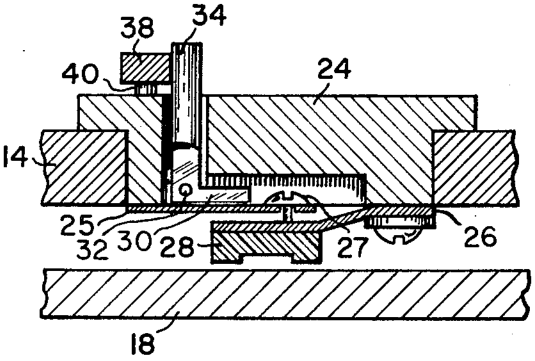
FIG. 3 is a cutaway elevation view taken along the lines 3—3 of FIG. 2.

Transducer modules 24 are shown in detail in FIGS. 2 and 3. FIG. 3 illustrates an internal elevation view of the transducer module 24 and shows, mounted to the bottom surface of module 24, a relatively strong cantilever leaf spring 25 that exerts an upward retracting force and a reed spring 26 which supports a shoe 28 and urges it downward to float on the air bearing produced by laminar air flow on the surface of the rotating disc 18. Shoe 28 contains one or more magnetic transducers (not shown) which must be mounted in shoe 28 so that the recording portion of the transducer is in working relationship with the magnetic surface of disc 18 when shoe 28 is flying on the laminar air bearing. Leaf spring 25 exerts a relatively strong upward force and is coupled to shoe 28 by a pin or a machine screw 27 attached to the shoe but loosely fitting into a hole in the spring 25, so that the normal retracting force of leaf spring 25 will lift the shoe from the surface of disc 18. The shoe is actuated downward toward the disc by the operation of a crank lever 30 which bears against the top surface of leaf spring 25 to release its retracting force so that the downward force of reed spring 26 will position shoe 28 into its operating position. Lever 30 is fastened to the transducer module 24 by a pivot pin 32, and the vertical arm 34 of the lever 30 passes through aperture 36 in the housing of transducer module 24. The size of aperture 36 is sufficiently larger than the diameter of arm 34 so that arm 34 may be pivoted to actuate lever 30 to release all retracting force exerted by the cantilever leaf spring 25.

FIG. 2 illustrates a plan view of the transducer module 24 and shows arm 34 extending through aperture 36. The extended portion of arm 34 is moved by a lever 38 attached to the top surface of transducer module 24 by a pivot 40. On the opposite end of this dog-leg lever 38 is mounted a pulley 42 of a suitable diameter and size to accommodate a small cable 44.

As shown in FIG. 1, cable 44 passes around all pulleys 42 associated with each of the transducer modules 24 and the ends of the cable terminate on a capstan 46 on the shaft of a small, electric motor 48. Thus when motor 48 is energized, capstan 46 will take in cable 44 thereby drawing in the dog-leg levers 38 which, in turn, actuate arms 34 that pivot to release the retracting leaf springs 25 so that reed springs 26 will urge shoes 28 toward the working surface of the disc 18. Arms 34 of crank levers 30 will move only until they strike the edge of aperture 36 in the top surface of the modules 24. At that point the retracting forces of all the cantilever leaf springs 25 have been removed, the reed springs 26 have positioned all shoes 28 into proper working relationship with the disc surface, and motor 48 will be unable to draw in any more of the cable 44. Motor 48 then stalls and maintains this stall condition until its electrical power is removed either by the shutting down of the equipment or by a power failure. When the power is removed, the rotational force exerted by motor 48 is also removed so that the force exerted by leaf springs 25 will lift pins 27 to urge shoes 28 from the disc surface. The upward force of leaf spring 25 will return crank lever 30 to its normal position which, in turn, forces lever 38 to withdraw cable 44 from the capstan 46.

What is claimed is:

1. A magnetic disc memory including: a housing having a base, top, and sidewall; a rotatable memory disc within said housing; a motor for rotating said disc; at least one magnetic transducer adapted to be positioned into working relationship with the magnetic surface of said disc; and actuating means for supporting said transducer in a normally retracted position and for positioning said transducer into working relationship with the disc surface, said actuating means comprising:

a first spring coupled to said transducer for urging said transducer toward the surface of said disc;

a second spring coupled to said transducer and exerting a retracting force greater than, and substantially opposite to, the urging force of said first spring for supporting said transducer in a position retracted from the surface of said disc;

a lever positioned to bear upon said second spring, said lever being movable about a pivot for applying a force to overcome the retracting force exerted by said second spring;

an electric motor having a rotatable shaft; and a flexible cable connected to the shaft of said motor and engaging a rotatable pulley mechanically coupled to said lever so that electrical excitation of said motor will draw in said cable to move said lever about its pivot.

2. The disc memory claimed in claim 1 wherein said transducer, said lever, and said actuating means are mounted in a module removably positioned in the top of said housing.

3. The disc memory claimed in claim 1 wherein said motor is driven to its stall condition after being energized.

4. The disc memory claimed in claim 3 including a plurality of said modules positioned in the top of said housing and wherein said flexible cable engages all pulleys of all actuating means for both the simultaneous actuation and release of all transducers.

* * * * *